(12) United States Patent
Nash et al.

(10) Patent No.: US 7,721,153 B2
(45) Date of Patent: *May 18, 2010

(54) SYSTEM, METHOD AND PROGRAM PRODUCT FOR RECOVERING FROM A FAILURE

(75) Inventors: Richard John Nash, Hampshire (GB); Gary Paul Noble, Worcestershire (GB)

(73) Assignee: International Business Machines Corporation, Armonk, NY (US)

( * ) Notice: Subject to any disclaimer, the term of this patent is extended or adjusted under 35 U.S.C. 154(b) by 20 days.

This patent is subject to a terminal disclaimer.

(21) Appl. No.: 12/128,597

(22) Filed: May 28, 2008

(65) Prior Publication Data

US 2008/0222448 A1 Sep. 11, 2008

Related U.S. Application Data

(63) Continuation of application No. 11/082,043, filed on Mar. 16, 2005, now Pat. No. 7,395,455.

(30) Foreign Application Priority Data

Mar. 17, 2004 (GB) .................. 0405941.6

(51) Int. Cl.
*G06F 11/00* (2006.01)
(52) U.S. Cl. .............. 714/36; 714/38; 713/1; 713/2
(58) Field of Classification Search .............. 714/36, 714/38; 713/1, 2
See application file for complete search history.

(56) References Cited

U.S. PATENT DOCUMENTS

| 6,061,788 | A | 5/2000 | Reynaud et al. |
| 6,122,572 | A | 9/2000 | Yavnai |
| 6,381,694 | B1 | 4/2002 | Yen |
| 6,792,526 | B1 | 9/2004 | Klein et al. |
| 7,080,285 | B2 | 7/2006 | Kosugi et al. |

*Primary Examiner*—Robert Beausoliel
*Assistant Examiner*—Charles Ehne
(74) *Attorney, Agent, or Firm*—Silvy A. Murphy; Arthur J. Samodovitz

(57) ABSTRACT

System, method and computer program product for recovering from a failure of a computing device. Start up of a first component of the device is monitored and a determination is made whether the first component has started successfully. If so, a second, higher level component of the device is started. Operational data received from the second component is monitored. If the operational data falls outside of an operational boundary, an action is performed on the second component to enable the second component to operate within a preferred operational boundary. If the first component does not start up successfully, a determination is made if start up of the first component is critical to operation of the second component. If so, a corrective action is performed relative to the first component and afterwards, an attempt is made to start up the second component.

20 Claims, 4 Drawing Sheets

SYSTEM, METHOD AND PROGRAM PRODUCT FOR RECOVERING FROM A FAILURE

CROSS-REFERENCE TO RELATED APPLICATIONS

This application is a Continuation of U.S. patent application Ser. No. 11/082,043, filed Mar. 16, 2005, now U.S. Pat. No. 7,395,455 the priority to which is hereby claimed, and is hereby incorporated by reference, and which further claims the priority benefit to and incorporates by reference Great Britain Patent Application No. 0405941.6 "A Recovery Framework" filed on Mar. 17, 2004 by International Business Machines Corporation.

BACKGROUND OF THE INVENTION

The invention relates generally to autonomic computing and more particularly to a recovery technique for a computing device.

Laptop computers, PDA's and mobile phones along with improved telecommunications have enabled mobile computing. There are also embedded computing devices in many products. With both embedded computing devices and certain types of mobile computing devices, the user may not have a direct interface to enter commands or learn the status of the computing device.

Mobile computing devices, despite their limited resource availability, offer a high level of functionality. A typical example is a mobile phone which comprises a camera, gaming software and PDA software. To provide this functionality, many software components and hardware components are required to operate and interact with each other. Inevitably hardware and software faults occur.

An IBM Tivoli™ program, using a centralized system, is known to perform fault monitoring and detection. In order for the Tivoli program to communicate with an application installed on a remote device, network connectivity is provided between the centralised system and an application located on the remote device. The centralised system periodically sends a message to the application located on the remote device. The centralised system waits for a response message. Receipt of the response message indicates whether the application is running. If the centralised system receives a "not responding" message, the centralised system can, under the guidance of an operator, perform some form of corrective action such as rebooting the device or applying a software fix.

A problem occurs when fault monitoring and maintenance need to be undertaken on a mobile computing device. A centralised system requires a constant network connection for prompt action; however, the mobile computing device may only be connected to a network for five minutes a day or for twenty minutes once a week. Consequently, a centralised fault monitoring model is unable to effectively and promptly support a mobile computing device.

An example of a mobile computing device can be found in U.S. Pat. No. 6,122,572. This patent discloses a programmable decision unit located in an unmanned vehicle which is capable of managing and controlling the execution of a mission by utilising a plurality of subsystems. The programmable decision unit includes a mission plan for accomplishing the execution of a mission. The programmable decision unit carries out its mission by following a pre-designed mission plan. A mission plan is downloaded before each mission commences. The mission plan allows for exceptional events to occur and corrective actions are taken based on the directives stated within the mission plan. Updates to the mission plan are carried out by applying a code fix to one or more mission plans. The mission plan is therefore a static entity and can only be updated by developing a new piece of software which replaces the existing plan. Installation of a software fix is not easy.

Therefore, it would be beneficial if the mobile computing device could take some form of corrective action itself without any assistance from a centralised system or a software fix is installed.

Accordingly, an object of the present invention is to improve the ability of a computing device to correct problems with itself.

SUMMARY OF THE INVENTION

The invention resides in a system, method and computer program product for recovering from a failure of a computing device. Start up of a first component of the device is monitored and a determination is made whether the first component has started successfully. If so, a second, higher level component of the device is started. Operational data received from the second component is monitored. If the operational data falls outside of an operational boundary, an action is performed on the second component to enable the second component to operate within a preferred operational boundary.

According to features of the present invention, if the first component does not start up successfully, a determination is made if start up of the first component is critical to operation of the second component. If so, a corrective action is performed relative to the first component and afterwards, an attempt is made to start up the second component.

In one implementation of the present invention, there is a first recovery component which monitors the start up of each low level component and records the status of each low level component in a state table. The state table indicates if a component is running or not running. If a component is not running, the first recovery component performs a lookup in the state table to determine if a failed component is critical to the continued operation of the device. If the failed component is critical to the continued operation of the device, the first recovery component may shut down all running components and send a message to a centralized system requesting help. If the failed component is not critical to continued operation of the device, the first recovery component may still provide a guarantee to the second recovery component that the low level environment is secure. A secure and trusted environment may be needed for subsequent recovery program components to operate. Once the first recovery component is satisfied that all low level components which are required to enable the device to operate, are successfully operating, the first recovery component sends a message to the second recovery component to ask it to start. In response, the second recovery component loads from a data store one or more health records and actions. A health record is created in the data store for each application required to run on the device. By loading the health records in to a health table stored in memory, the second recovery component is able to ascertain which application to start. Programmed rules also dictate which applications and associated health records are required. Before loading other applications as defined by the rules and the health records, the second recovery component sends a message back to the first recovery component requesting the 'hand over' of recovery control from the first recovery component to the second recovery component. A 'hand over' will not typically take place unless the first recovery component can ensure the low level environment is secure and robust. If the low level environment is not secure and robust, the first recovery component will typically request assistance. If upon launching the second recovery component, the second recovery component is unable to start, the first recovery component may power down all low level components and request assistance. Preferably, applications are launched by the second recovery component according to one or more rules stored in a data store. Preferably, each component launched by the second component sends a message to the second recovery component. The message comprises operational data indicative of the operational status of the device. The operational data is extracted from the message and updated in the component's health record. Further messages are sent to the second recovery component every x number of seconds or milliseconds, for example. A rule is associated with a health record. Preferably, the rule determines if the operational data extracted from the message falls outside of an operational boundary. If the operational data falls outside of the operational boundary, the rule triggers an action to be performed. The action may be, for example, to restart a component, shut down another component that may be attributing to the problem or perform an upgrade. Preferably the action performed is recorded in the component's health record. Further actions may be performed, in a sequential or cascaded manner, in response to subsequent operational data being recorded in the component's health record.

DETAILED DESCRIPTION OF THE PREFERRED EMBODIMENTS

Figure 1:
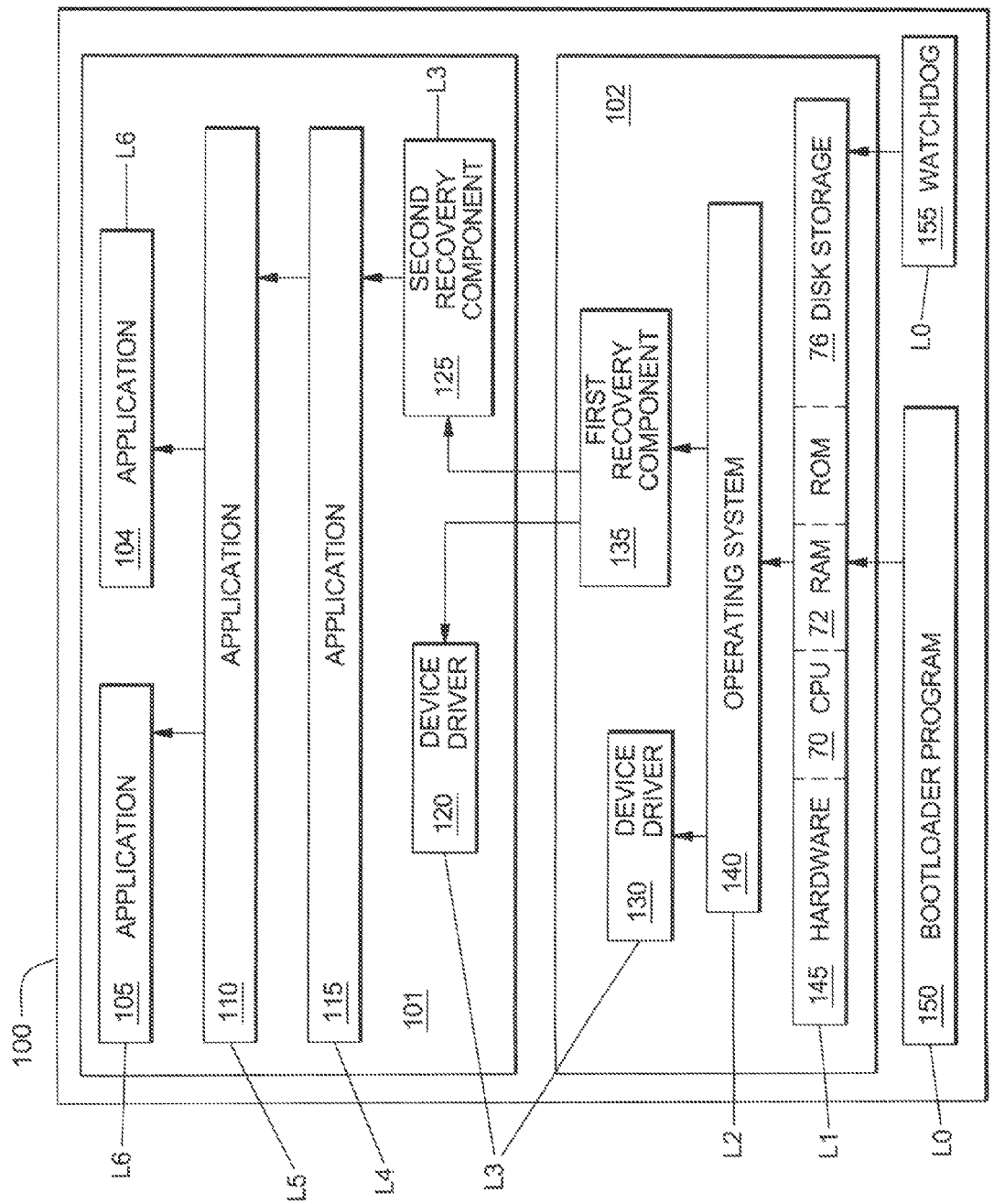
FIG. 1 is a block diagram of a device comprising a first recovery system and a second recovery system, according to the present invention.

FIG. 1 shows a block diagram of a device 100. The device 100 may be any type of computing device that can operate in a stand-alone manner, for example, a personal computer, laptop computer, PDA, mobile phone, etc., as well as embedded computing devices that can be found in household and industrial products such as washing machines, boilers, automobiles, televisions, etc.

Device 100 comprises a number of components 105 to 155. The components may be categorised into two groups, low level components 102 and high level components 101. Low level components 102 and high level components 101 may reside at different layers ("L") of a device stack. For example, a device stack may be as follows:

L6 Applications

L5 System management framework

L4 Communications

L3 Device drivers 120 and 130

L2 Operating system

L1 Hardware

L0 Bootloader

The low level components 102 may be categorised by L0 to L3 of the device stack and the high level components 101 may be categorised by levels L4 to L6 of the device stack. In one embodiment of the present invention, level L3 may operate in the lower levels of the device stack or in the higher levels of the device stack.

The low level components 102 comprise hardware 145 and software components 150, 140, 130 that are needed to initiate the device on start up, for example, the hardware and software components located in L0 to L3 of the device stack.

Depending on the functional requirements of the device 100, the device 100 may comprise different hardware components 145. A basic device may comprise a motherboard or some form of integrated circuit, a central processing unit (CPU) 70, Random Access Memory (RAM) 72, Read Only Memory (ROM) and some persistent/disk storage 76. A more complex device may comprise all of the hardware components mentioned above and, for example, a Global Positioning System (GPS) driver, a network card such as, a General Radio Service (GPRS) data card and other functional components etc.

The hardware requirements of the device 100 will vary depending on the type of device 100. Typically, an embedded device has limited resources, for example, thirty kilobytes of SDRAM and low CPU usage. Alternatively, a personal computer may have 512 megabytes of SDRAM and high CPU usage.

Another example of a low level component 102 is a bootloader program 150 (L0 of the device stack). Switching the device 100 on for a first time or rebooting the device 100 requires a bootloader program 150 to initiate. The bootloader program 150 initiates all aspects of the device 100 including retrieving hardware configuration settings from the CMOS RAM, loading the interrupt handlers, checking video card operation (only necessary if the device has an interface), verifying that the RAM is functioning by performing a read/write test of each memory address and checking the PS/2 ports or USB ports for any input/output devices, etc. If the device 100 comprises an operating system 140, the bootloader program 150 initiates the operating system 140.

An operating system 140 may be installed which resides in the operating system layer (L2) above the hardware layer (L1), interfacing with device drivers L3 and applications located in an application layer (L4 to L6). The operating system 140 manages the hardware and software resources of the device and provides a stable and consistent manner in which applications can interact with the hardware 145 without the application needing to know the technical details of how a particular hardware component 145 works.

The choice of operating system 140 is dependent on the type of device 100 to be used, for example, the Microsoft Windows XP™ Operating System may be suitable for personal computers and laptops. Alternatively, embedded devices 100 for use in the automotive industry, medical environment and industrial automation markets may require an operating system 140 that is more suited to that environment, for example QNX™ operating system real time operating system or Microsoft Windows CE™ operating system.

Alternatively, some types of device 100 may not require an operating system 140. For example, a device 100 that performs simple input/output operations, such as, a microwave may not require an operating system. Installing an operating system 140 on these types of device 100 would add an unnecessary layer of complexity. In the case of these types of device 100, the bootloader program 150 and the operating system 140 may be merged into one.

High level components 101 comprise software applications 105, 104, 110, 115 that reside in the application layer (L4 to L6) above the operating system 140. Applications allow the device 100 to perform many different tasks, for example, performing a computational task on coordinates received from a GPS component or sending data to another device etc.

The software applications 105, 104, 110, 115 may be written in any type of programming language, for example Java (™ of Sun Microsystems Inc.) or C++ programming language. High level applications often are interpreted or compiled languages and therefore add another layer of complexity to the device 100. The software applications 104, 105, 110, 115 may be pre-installed on the device at the time of manufacture or may be provided as 'plug in' modules such that an engineer or consumer could download or install the application when the need arises.

In a first embodiment of the present invention, a first recovery program component 135 and a second recovery program component 125 are installed on the device "i.e. the first recovery component 135 and the second recovery component 125 are stored on disk storage 76 for execution by CPU 70 via RAM 72. (The first and second recovery program components can be loaded from a computer readable storage medium such as a disk or tape or downloaded via a computer readable network medium such as the Internet.) Together the first recovery component 135 and the second recovery component 125 comprise a recovery framework in which corrective actions may be taken to ensure the long running of the device 100. The first recovery component 135 and the second recovery component 125 operate independently of each other, but co-operate with each other to communicate control of the device.

The first recovery component 135 may be categorised as a low level component 102 and may be operable for residing in the operating system level (L2) or other lower levels of the device stack, for example, installed in the Read Only Memory (ROM) on a motherboard (L0 of the device stack).

The first recovery component 135 may be developed in any programming language, but in a preferred embodiment the first recovery component 135 is developed in a low level programming language such as C or an assembly language. It is important that whatever programming language is used, it provides a stable environment, in which the first recovery component 135 can operate, provide performance benefits and be easily translated into machine code. The first recovery component 135 may be hard coded with one or more actions to perform in the event of failure of one of the low level components 101 and hence is static in its configuration.

The first recovery component 135 may be initiated by a bootloader 150 program (L0) independently of the operating system 140 or may be initiated in parallel with the operating system 140.

The first recovery component 135 ensures that the low level environment 102 is stable and secure in which further high level applications 104, 105, 110, 115 may run safely.

A second recovery component 125 is installed for providing monitoring, detection and recovery support to the high level components 105, 104, 110, 115 and is operable for residing in the application layers L4 to L6. The second recovery component 125 will only operate once the first recovery component 135 guarantees a secure and stable low level environment 102.

The second recovery component 125 may be written in any programming language, but in a preferred embodiment the second recovery component 125 is developed in a programming language such as C.

Although FIG. 1 has been described with reference to a first recovery component 135 and a second recovery component 125, the functionality of the recovery framework may be provided by more or less recovery components without departing from the scope of the invention.

Figure 2:
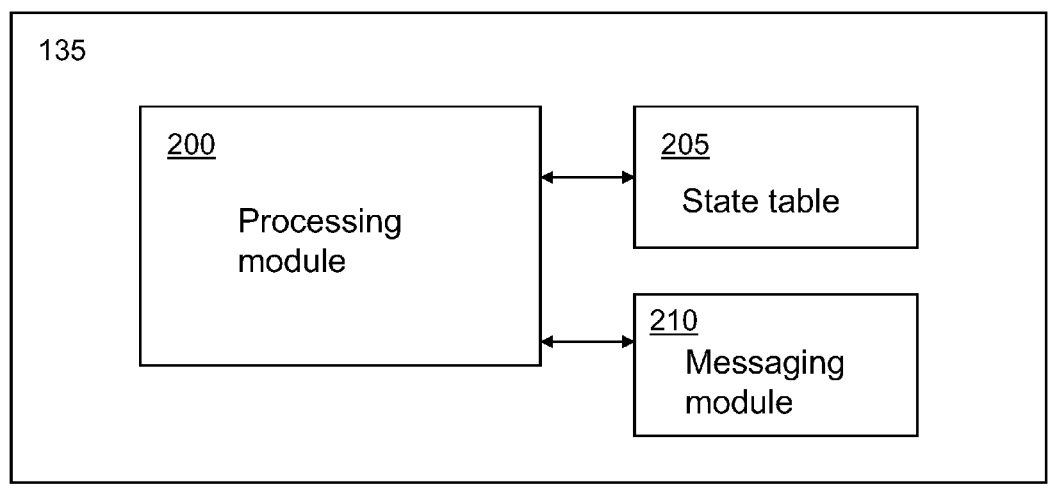
FIG. 2 is a block diagram illustrating the components of the first recovery system of FIG. 1.

Referring to FIG. 2, the first recovery component 135 comprises a processing module 200, a state table 205 and a messaging module 210. The processing module 200 is responsible for ensuring each low level component 102 is working and functioning correctly and providing a trusted environment in which more complex and less stable applications may operate.

The processing component 200 performs read/write operations on a state table held 205 in memory. The state table 205 enables the first recovery component 135 to log the operation status of each low level hardware and software component 102, for example, running or not running. The status of each low level component 102 is determined by each low level component 102 sending a message to the processing module 200. If a message is not received by the processing module 200, the absent low level component 102 is logged as not running in the state table 205.

The processing program module 200 performs a predetermined action based on the status of each of the low level components 102 stored in the state table 205. For example, if the status of a hardware component 145 is logged as not running, a determination may be made as to whether the hardware component 145 is critical to the continued functioning of the device 100. This determination is based on programmed rules which indicate which hardware and software components are critical. If the loss of the hardware component 145 is not critical to the continued functioning of the device 100, the processing module 200 may continue to instruct the second recovery component 125 to start. In this case the processing module 200 may be able to provide a guarantee to the second recovery component 125 that the low level environment is stable. If the loss is critical to the continued functioning of the device 100, the processing module 200 may perform a predetermined action. For example, processing module 200 may instruct a watchdog program 155 to restart the device 100 or, using a low level communication module in the messaging component 210 such as UDP or SMS, send a message to a centralised system to request assistance. Depending on the nature of the failure and the respective rule(s) which specify the remedial action, the processing module 200 may perform other remedial actions such as starting, stopping or restarting a program, sending a failure message to any person or system specified in the rule, rebooting a computing device, launching a script or other program, etc. The remedial actions can be cascaded if needed, i.e. implementing two or more of such actions in a sequence if more than one action is needed to correct the problem, or trying a first action, and if it does not succeed, then trying a second, alternate action.

If the problem cannot be corrected automatically and a failure message is sent, then processing module 200 may put device 100 into a limited functional state. In this state, device 100, although not able to function as intended, is able to send a message via the messaging component 210 to the centralised system to indicate that the device 100 has developed a fault. The message may comprise information about the type of fault, for example, the failure of a memory address or the failure of a hard disk drive.

In this manner faults are detected as soon as the device starts and are isolated such that the appropriate actions may be undertaken. Using an analogy of constructing a building, the first recovery component 135 ensures that the foundations or the low level building blocks of the device are firm and stable before the structure of the building is built i.e. the high level applications.

If the entries in the state table 205 indicate all low level applications 102 are running, a message is sent to the second recovery component 125 to start. Alternatively, the first recovery component 135 may instruct a command to initiate and run an autoexec.bat file or start up script, which may be used to start the second recovery component 125.

Figure 3:
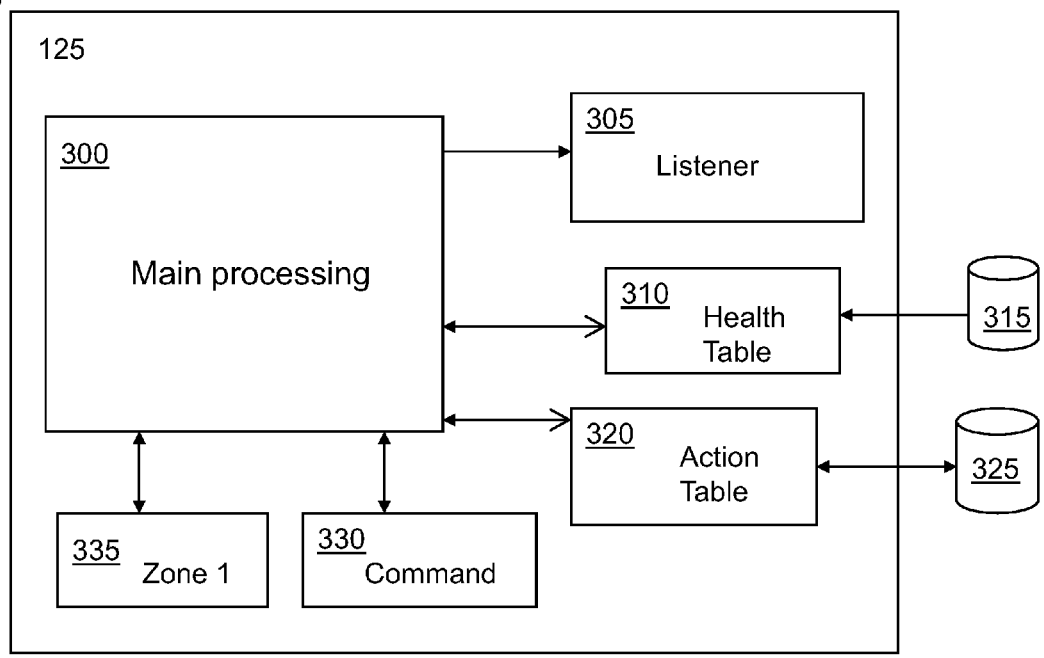
FIG. 3 is a block diagram illustrating the components of the second recovery system of FIG. 1.

FIG. 3, illustrates the components that comprise the second recovery component 125. The second recovery component 125 comprises a main processing module 300 for loading, processing and saving updates to a health table 310, an action table 320, a UDP listener 305, a limited function zone processor 335, a command processor 330 and data stores 315, 325 for storing at least one health table 310 and at least one action table 320.

The main processing module 300 retrieves from the data store 315, one or more health records relating to an application 104, 105, 110, 115 and loads the health records into the health table 310. A health record stores operational data pertaining to an application. Associated with each health record is a rule. A rule determines if the operational data falls outside of operational boundaries. If the operational data falls outside of a particular operational boundary an action is triggered. The action may be performed by the second recovery component to rectify the problem that is causing the application to run outside of the operational boundary.

One or more actions associated with one or more rules are retrieved from the data store 325 and loaded into the action table 320.

A health record further comprises rules which inform the processing component which applications are required to start on initiation of the device. Each application may have its own health record or if appropriate, a sub component of an application may have its own health record. The logic behind which application has its own health record is decided within the application development lifecycle. Application developers must decide where the critical points of failure are within their applications and hence the most likely points at which an application will fail. If it is determined that an application may have multiple points of failure each point of failure may be categorised as a sub component.

For clarity, the term application will be used throughout the description and is intended to encompass the term sub component.

A health record comprises operation data relating to an application. A health record may comprise the following categories:

Health check id: A unique health identifier used for determining the status of the application.

Health check code: A unique health identifier, for example, running out of memory.

Time to action: The time in which a message was last received.

Time delay: The time in between sending messages, for example, 120 seconds.

Actions and rules may be updated dynamically in the data store by an external source.

As each health record is loaded into the health table, the corresponding application is instructed to start by the main processing component 300. Each application notifies it is running by sending a message to the main processing component 300.

The message may take the form of any messaging mechanism, but in a preferred embodiment the messaging mechanism is UDP. UDP provides a means of transmitting messages of up to 64 Kbytes in size between pairs of processes. Although UDP offers no guarantee of message delivery it is none-the-less a lightweight messaging mechanism which offers performance benefits in an embedded environment.

The message comprises operational data which is extracted from the message and stored in one or more health records. A rule determines if the operational data falls outside an operational boundary and which in turn triggers an action.

Example 1 shows a health table comprising four health records for application X shortly after application X has started and has sent its first message to the main processing component 300.

| Example 1 | |
|---|---|
| Field name | Application X |
| HealthCheckID | 12 |
| HealthCheckCode | OM |
| TimeToAction | 30 milliseconds |
| TimeDelay | 120 seconds |

After a predetermined amount of time, application X sends a further message to the second recovery component 125 which is received by the main processing module 300. As shown in example 2, the health records are updated with operational data extracted from the message. As can be seen from Example 2, the data pertaining to the health record 'TimeToAction' has been updated from 30 milliseconds in Example 1 to 60 milliseconds in Example 2.

| Example 2 | |
|---|---|
| Field name | Application X |
| HealthCheckID | 12 |
| HealthCheckCode | OM |
| TimeToAction | 60 milliseconds |
| TimeDelay | 120 seconds |

Encoded within each health record are one or more rules that are triggered when the operational data of a component falls outside a particular threshold. For example, in Example 2, an action may be triggered when the health record 'TimeToAction' reaches, for example, 60 milliseconds.

Therefore a rule is associated with a health record that triggers an action based on the operational data of application.

An action may take the form of any one of the following:
Reboot the device
Stop and restart a component
Start an application
Stop an application by 'terminating' all threads
Set all health records to a particular status, power on and start up a network connection
Power down the component
Set the health records as specified in a parameter.
Reset an action
Run a script specified in the parameters
Send a message
An example of how a rule triggers an action is as follows:
Each application sends a message to the main processing component 300. The main processing component 300 extracts operational data from the message and updates the relevant health record in the health table 310. Each of the health records may be associated with a rule. The rule may state, for example, once the operational data associated with the health record falls outside of certain operational boundaries, a particular action is performed. The action performed is recorded in the health record, thereby building a history of the operational data and status of an application and any actions taken. Before the action is executed, a lookup is performed in the action table to determine if the action may be performed. For example, an action may have a rule that states an action may only be carried out for a predetermined amount of times. After the predetermined amount of time has expired, a different action may be performed. Hence cascading actions are performed.

Once the action has been performed, the main processing component 300 waits for further messages. Once received, the relevant health record is updated according to the operational data contained within the message. If the health record indicates on the next update that the application is still not operating within preferred operational boundaries, further actions may be undertaken. The further actions taken will depend on rules analysing the operation data of the application and previously tried actions. This creates a decision tree of cascading actions in order to allow an application to run within preferred operational boundaries.

The second recovery component 125 further comprises a listener component 305. The listener component may comprise a UDP listener, or any other component suitable for receiving a message.

The listener component 305 may receive one or more external commands from an external source via the command component 330. A command may be performed under the control of a centralised system or in the form of instructions to be carried out by the second recovery component 125.

Commands may take the form of entering a 'limited function zone' 335, shutting down the second monitoring component, fetching the value of the health records, setting parameters and any other command that may be needed in order to return the device to within a preferred operational boundary.

The limited function component 335 allows the device to enter a 'safe zone' in which all applications may be shut down and the device 100 waits for external commands to be received.

Figure 4:
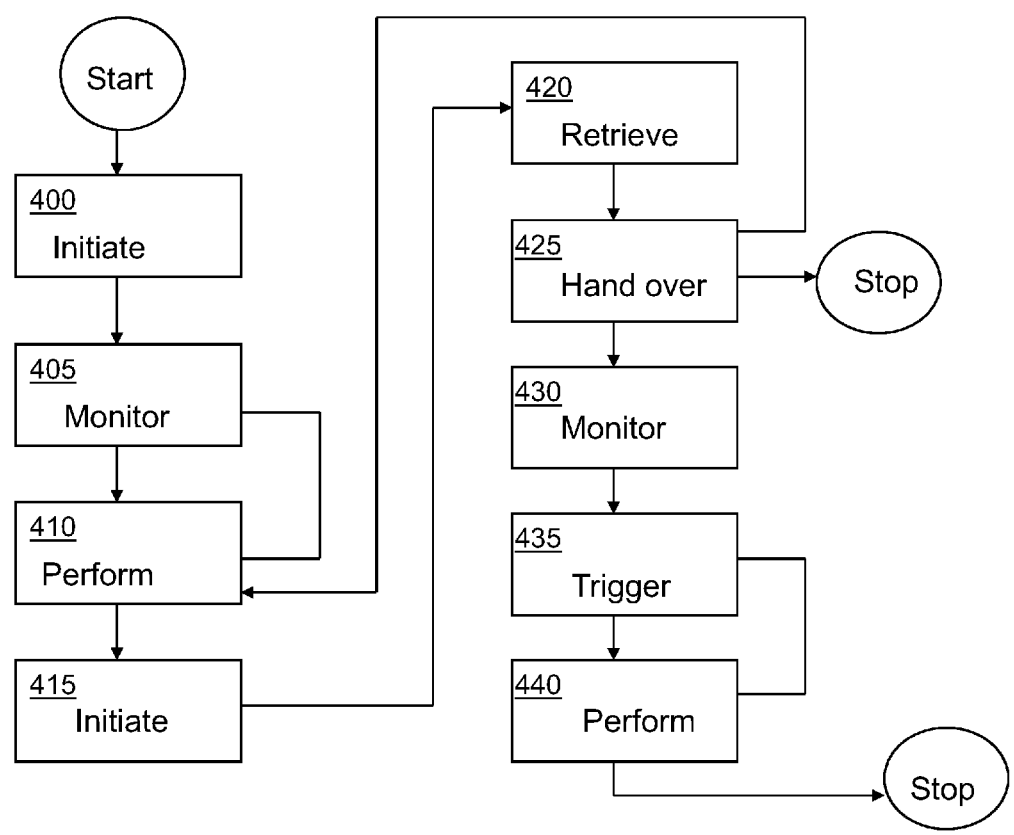
FIG. 4 is a flow chart of the first and second recovery component.

Referring to FIG. 4, the processing steps of the first recovery component 135 and the second recovery component 125 are explained.

At step 400, the first recovery component 135 is initiated by the operating system 140 or a bootloader program 150. The first recovery component 135 assumes control over all low level components 102 started by the bootloader program 150 or the operating system 140. The first recovery component 135 may initiate further low level applications, such as, device drivers 130 or further hardware components 145. If a watchdog program component 155 is installed in the device, the first recovery component 135 sends a message to the watchdog component, every x number of seconds, to indicate to the watchdog 155 the first recovery component 135 is operating and still in control. In the absence of any message being received from the first recovery component 135, the watchdog 155 may wait a predetermined amount of time and if a message is still not received, the watchdog 155 may reboot the device 100.

The first recovery component 135 performs read/write operations on a state table 205 held in memory. The first recovery component 135 waits for a message from each low level component 102, the accumulation of which indicates all low level components 102 are running. If a message is not received from a low level component, the absent low level component 102 is logged as not running in the state table 205.

At step 405, the first recovery component 135 performs a predetermined action based on the status of a component logged in the state table 205. For example, if a hardware component 140 has failed, a determination may be made as to whether the hardware component 145 is critical to the continued functioning of the device 100.

If the loss of the hardware component is not critical to the continued functioning of the device, the first recovery component 135 may continue to instruct the second recovery component 125 to start. In this case the first recovery component 135 may still be able to provide a guarantee to the second recovery component 125 that the low level environment 102 is stable. If the loss is critical to the continued functioning of the device 100, the first recovery component 135 may perform a predetermined action, for example, instructing the watchdog 155 to restart the device 100 or sending a message to a centralised system to request help. In the later case, the device 100 may enter a 'limited function zone', in which the first recovery component 135, although not able to fully function, is able to send a message to a centralised system to indicate that the device 100 in not functioning within certain operational boundaries.

The centralised system in response to this information may take an appropriate action, i.e. send out an engineer, recall the device 100 or perform a software fix via a mechanism such as FTP or Telnet.

If the entries in the state table indicate that all low level applications are running, a message at step 415 is sent to the second monitoring component 135 requesting it to start. The second recovery component 125 receives the message and sends a reply message back to the first recovery component 135 to acknowledge receipt of the message.

At step 420, the second recovery component 125 sends a request to a data store 315, 325 to retrieve one or more health records and one or more actions 320. Once all health records and actions have been retrieved from the data store and loaded into the respective tables, the second recovery component 125 sends a message to the first recovery component 135 informing it has started successfully and requesting the 'hand over' of recovery control of the device. In response to the message, the first recovery component 135 'hands over' recovery control to the second recovery component 125 at step 425. After gaining control from the first recovery component 135, the second recovery component 125 assumes control over the watchdog 155 and begins sending messages to the watchdog 155, for example, every x number of second to inform the watchdog 155 it is still 'running'.

At step 430, the second recovery component 135 waits to receive a message from each of the running applications 104, 105, 110, 115 and updates one or more health records with the status of each of the applications 104, 105, 110, 115. The second recovery component 125 waits for further messages to be received from one or more applications 104, 105, 110, 115. Each time a message is received, information is extracted from the message and the relevant health records are updated. As soon as a rule determines that one or more health records have fallen outside of an operational boundary an action is triggered at step 435. A lookup is performed in the action table to request authorisation of the action to be performed. Further rules are associated with actions to determine whether the action being performed is having no effect on the operation of the device and whether different actions should be performed. Once authorisation is given, the second recovery component 125 performs the action at step 440. For example, the action may be to instruct an application to shut down and terminate any active threads.

The second recovery component 125 on performing the action, records the action in the health record and the data store 325, enabling action records to persist after a reboot of the device 100.

Control passes back to step 430, and the second recovery component 125 waits for further messages to be received from the one or more applications 104, 105, 110, 115. Again, information is extracted from the messages and the appropriate health record is updated in the health table 315. It is possible that a previous action did not completely return the status of an application to within preferred operating boundaries and hence did not rectify the fault. If this is the case, the second recovery component 125 will realize this when a message is received from the application and the application's health record is updated. A further rule may be triggered to perform a further action and hence a cascading rule and action set emerges for any given deviation from preferred operational boundaries.

A continual operation of updating health records and triggering rules to perform actions is carried out to ensure that the device is able to operate in a standalone manner for an indefinite period of time.

Referring again to step 415, the first recovery component 135 sends a message to the second recovery component 125 requesting it to start. The first recovery component waits for a response message. If after a predetermined amount of time, no response message is received, the first recovery component may either send a further message to the second recovery component and wait for a message (a message may only be sent for a certain number of times, otherwise the device will be performing an indefinite loop of instructions), or take some other form of action. For example, an action may be taken to power down each running low level component 102 and enter into a 'limited function state'. A message may be sent to a central system requesting assistance.

To further explain the relationship between a health records, rules and actions examples have been provided below.

Examples of the Relationship Between Health Records and Actions:

Example 3

An application 104, 105, 110, 115 sends a message to the second recovery component 125. The message comprises operational data that indicates that the application is experiencing problems performing a computational task. The operational data is extracted from the message and the relevant health record is updated. A rule dictates that the operational data falls outside of a preferred operational boundary and may be attributed to low memory resources. The rule further states due to this particular problem, the application must be shut down and re-started. A lookup is performed within the action table to determine if the action can be performed. In this example, the action has not been performed in relation to the application or deviation on a previous occasion and the action is authorised. The second recovery component 125 shuts down and restarts the application 104, 105, 110, 115. The action is recorded in a data store and updated in the application's health record.

The application once restarted sends a message to the second recovery component 135 and the application's health record is updated including information on the action performed and the number of times the action has been performed. In this instance, a counter for the number of time the action has been performed is incremented to 1.

Example 4

The same application, as in example 3, sends a message to the second recovery component 125. The message comprises operational data that indicates that the application is experiencing problems performing a computational task. The rule states that the application should be shut down and restarted. A lookup is performed in the action table to determine if the action may be performed. In this example, the action is authorised and the second recovery component 125 performs the action. The application once restarted sends a message to the second recovery component 125 and the application's health record is updated including information on the action performed and the number of times the action has been performed. In this instance, the counter is incremented to 2.

Example 5

The same application, as in example 3 and 4, sends a message to the second recovery component 125. The message comprises a parameter that indicates that the application is experiencing problems performing a computational task. The rule states that the application should be shut down and restarted. Once again a lookup is performed in the action table and a rule in the action table states if this action has already been performed twice, then another action should be triggered. The second component determines the number of times the action has been performed and because in this example the action has been performed twice, a further (different) action is triggered, which may be to shut down another application that is consuming a large amount of memory resources. The action is recorded in the application's health record and updated in the data store and a further counter is incremented to indicate how many times the (different) action has been performed. The application continues to send messages to the second recovery component 125.

Example 6

The second recovery component 125 instructs, based on a rule, other applications to start. The second recovery component waits for a message from each of the applications 104, 105, 110, 115 and 120. If at any time the second recovery component 125 does not receive a reply, the relevant health record is updated indicating the time of the last received reply. If the time since the last received reply falls outside a particular operational boundary, a rule may state that the application should be powered down and restarted. Again, a lookup is performed in the action table to authorise the action. If after several attempts this does not work, a determination may be made as to whether the application is critical to the operation of the device. If in response a positive determination, the second recovery component may, based on a rule, place the device in a 'limited function zone', where external assistance may be requested.

Example 7

At some point in the device's life, applications may need to be upgraded. In this instance, rules may be configured that allow an application to be 'out of reach' for a given time period in which the upgrade may take place, but after the time period has expired, the second recovery component 125 will expect a message to be received from the application informing of its operational status. If no message is received it may be assumed the upgrade did not work and a further action my need to be undertaken.

Based on the foregoing, a system, method and program product for autonomic correction of a computing device have been disclosed. However, numerous modifications and substitutions may be made without deviating from the scope of the present invention. Therefore, the present invention has been disclosed by way of illustration and not limitation, and reference should be made to the following claims to determine the scope of the present invention.

What is claimed is:

1. A method for recovering from a failure of a computing device, the method comprising the steps of:
   the computing device monitoring a first component in a first layer of a device stack of the computing device;
   the computing device determining, using data gathered by the first component, whether or not start up of the first component in the computing device is successful, wherein if the start up of the first component is determined to be successful, the computing device initiating start up of a second component residing in a second higher layer of the device stack of the computing device, and wherein if the start up of the first component is determined to be unsuccessful, the computing device determining if the start up of the first component is significant for continued functioning of the computing device, wherein if the start up of the first component is determined to be significant for continued functioning of the computing device, the computing device performing at least one corrective action with respect to the first component for initiating the start up of the second component;
   the computing device monitoring data gathered from the second component; and
   the computing device determining whether or not the data monitored for the second component falls outside of a boundary and, if the data monitored for the second component is determined to fall outside of the boundary, performing at least one action on the second component to enable the second component to operate within the boundary.

2. A method as claimed in claim 1, further comprising the steps of:
   the computing device logging a status of a plurality of first sub-components of the first component for determining whether or not the start up of the first component is successful.

3. A method as claimed in claim 2, wherein if the start up of the first component is determined to be unsuccessful and if the start up of the first component is determined to be significant to operation of the second component, further comprising the steps of:
   the computing device disabling the first component; and
   the computing device communicating a message to an external system requesting assistance.

4. A method as claimed in claim 3, further comprising the steps of:
   the computing device logging a status of each of a plurality of second sub-components of the second component for determining whether or not the data monitored for the second component falls outside of the boundary.

5. A method as claimed in claim 4, wherein the data monitored for the second component is based on one or more predefined, programmed rules which trigger performance of the at least one action on the second component to enable the second component to operate within the boundary.

6. A method as claimed in claim 3, further comprising the step of:
   if the start up of the first component is determined to be unsuccessful and if the start up of the first component is determined to be not significant to operation of the second component, the computing device communicating recovery control for the computing device from the first component to the second component.

7. A method as claimed in claim 6, wherein the communicating step further
comprises the steps of:
   sending, by the first component, a message to the second component, to start the second component; and
   transferring recovery control for the computing device from the first component to the second component.

8. A computer program product for recovering from a failure of a computing device,
the computer program product comprising:
   a computer readable storage medium;
   first program instructions for monitoring a first component of the computing device, the first program instructions including instructions to determine whether start up of the first component is successful, and if the start up of the first component is determined to be successful, initiating start up of a second component of the computing device, wherein the first program instructions include instructions, responsive to unsuccessful start up of the first component, determine if the start up of the first component is significant to operation of the second component, wherein the first program instructions include instructions, responsive to the start up of the first component being determined to be significant to the operation of the second component, to perform at least one corrective action with respect to the first component for initiating start up of the second component;
   second program instructions to start up the second component of the computing device responsive to a determination of successful start up of the first component, the second program instructions including instructions to monitor data received from the second component and to determine whether or not the data monitored falls outside of a boundary; and
   third program instructions, responsive to the data falling outside of the boundary, to perform at least one action on the second component to enable the second component to operate within a preferred boundary; wherein
   the first, second and third program instructions are stored on the computer readable storage medium.

9. A computer program product as claimed in claim 8, further comprising:
   fourth program instructions to log a status of a plurality of first sub-components of the first component for determining whether the start up of the first component is successful, and wherein the fourth program instructions are stored on the computer readable storage medium.

10. A computer program product as claimed in claim 8, wherein the first program instructions include instructions, responsive to the first recovery component not starting up successfully and responsive to the first recovery component being determined to be not significant for continued operation of the second recovery component, to communicate transfer of recovery control for the computing device from the first component to the second component.

11. A computer program product as claimed in claim 10, wherein the second component operates responsive to the first component communicating to the second component that the first component is secure and stable.

12. A computer program product as claimed in claim 10, wherein the fourth program instructions include instructions, responsive to the first component not starting up successfully and responsive to the first component being significant to operation of said the second component, to disable the first component and communicate a message, to an external system, requesting assistance.

13. A computer program product as claimed in claim 10, wherein the fourth program instructions include instructions to log a status of a plurality of second sub-components of the second component for determining whether or not the data monitored for the second component falls outside of the boundary.

14. A computer program product as claimed in claim 13, wherein the data monitored for the second component is based on one or more predefined, programmed rules which trigger performance of the at least one action on the second component to enable the second component to operate within the boundary.

15. A system for performing recovery and corrective actions in a computing device,
the system comprising:
a CPU, a computer readable memory and a computer readable storage media;
a first recovery program component operating in a first level environment of the computing device, the first recovery program component determining whether or not start up of the first level environment is stable and secure based on data monitored for the first level environment;
a second recovery program component operating in a second level environment of the computing device, for determining based on data monitored for the second level environment whether or not the data monitored for the second level environment falls outside of a boundary, wherein the first recovery program component initiates start up of the second recovery program component if the start up of the first level environment is determined to be stable and secure, and wherein if the start up of the first level environment is determined not to be stable and secure, the first recovery program component determines whether or not the start up of the first level environment is significant for continued functioning of the computing device and, if the start up of the first level environment is determined to be significant for continued functioning of the computing device, performing at least one corrective action on the first recovery program component for stabilizing and securing the first level environment to initiate the start up of the second recovery program component, and wherein if the data monitored for the second level environment is determined to fall outside of the boundary for the second recovery program component, performing at least one action for enabling the second recovery program component to operate within the boundary; and wherein
the first recovery program component and the second recovery program component are stored on the computer readable storage media for execution by the CPU via the computer readable memory.

16. A system as claimed in claim 15, further comprising:
a first logging program component for logging a status of each of a plurality of first subcomponents of the first recovery program component for determining whether or not the start up of the first recovery program component is successful; and wherein
the first logging program component is stored on the computer readable storage media for execution by the CPU via the computer readable memory.

17. A system as claimed in claim 15, wherein, responsive to the first recovery program component not starting up successfully and being determined significant to operation of the second recovery program component, the second recovery program component disables the first recovery program component and communicates a message to an external system requesting assistance.

18. A system as claimed in claim 17, further comprising:
a second logging program component for logging a status of each of a plurality of second subcomponents of the second recovery program component for determining whether or not the data monitored for the second recovery program component falls outside of the boundary: and wherein
the second logging program component is stored on the computer readable storage media for execution by the CPU via the computer readable memory.

19. A system as claimed in claim 18, wherein the data monitored for the second recovery program component is based on one or more predefined, programmed rules which trigger performance of the at least one action on the second recovery program component to enable the second component to operate within the boundary.

20. A system as claimed in claim 17, wherein, responsive to the first recovery program component not starting up successfully and the first recovery program component being determined to be not significant for continued operation of the second recovery component, transferring recovery control for the computing device to the second recovery program component.

* * * * *